United States Patent [19]

Brown

[11] Patent Number: 4,888,959
[45] Date of Patent: Dec. 26, 1989

[54] BUS AIR CONDITIONER SUITABLE FOR MOUNTING WITHIN THE NORMAL PROFILE OF A BUS

[75] Inventor: Ronald W. Brown, New Hope, Minn.

[73] Assignee: Thermo King Corporation, Minneapolis, Minn.

[21] Appl. No.: 308,331

[22] Filed: Feb. 9, 1989

[51] Int. Cl.[4] ............................................. B60H 1/32
[52] U.S. Cl. ........................................ 62/244; 62/298;
62/DIG. 16
[58] Field of Search ................... 62/298, 244, DIG. 16

[56] References Cited

U.S. PATENT DOCUMENTS

| | | |
|---|---|---|
| 2,185,034 | 12/1939 | Melcher . |
| 2,320,596 | 6/1943 | Henney . |
| 2,774,227 | 12/1956 | Schjolin et al. . |
| 2,784,568 | 3/1957 | Schjolin . |
| 3,218,821 | 11/1965 | Spatt ........................................... 62/244 |
| 4,134,275 | 1/1979 | Erickson et al. ......................... 62/244 |
| 4,727,728 | 3/1988 | Brown ...................................... 62/244 |
| 4,748,825 | 6/1988 | King ......................................... 62/298 |
| 4,787,210 | 11/1988 | Brown ...................................... 62/89 |

*Primary Examiner*—Lloyd L. King

[57] ABSTRACT

A bus air conditioner which fits within the normal profile of a bus, which, from a single integral package, provides either heated or cooled conditioned air to upper and lower air duct distribution systems within a bus. A frame of the air conditioner includes an upper evaporator section having a first evaporator blower assembly which provides conditioned air for the upper air duct distribution system. The frame further includes a lower condenser section, and an air duct which extends downwardly from the evaporator section, through the condenser section, to a duct portion below the condenser section having a second evaporator blower assembly. The second evaporator blower assembly provides conditioned air for the lower air duct distribution system of the bus.

11 Claims, 8 Drawing Sheets

BUS AIR CONDITIONER SUITABLE FOR MOUNTING WITHIN THE NORMAL PROFILE OF A BUS

TECHNICAL FIELD

The invention relates in general to air conditioning systems for a bus, and more specifically to bus air conditioning systems which are suitable for mounting within the normal profile or outer structure of a bus.

BACKGROUND ART

Certain types of bus construction, such as buses which travel relative long distances at highway speeds between stops, desire minimal airflow drag and accordingly require that the air conditioning and air distribution system be confined within the normal outer structure of the bus. Typical prior art approaches to air conditioning and distribution systems for such buses spread the components of the cooling portion of the system about the bus, and the heating system is normally separate from the cooling system.

The distribution of air in a bus for heating, cooling, and fresh air circulation, is a major factor in obtaining satisfactory passenger comfort. The cooling of a bus is best accomplished with air from roof ducts which extend along the outer roof corners. Heating of a bus is best accomplished with air from floor and sidewall ducts.

Cooling a bus with floor and sidewall ducts is not efficient, and requires a relative long pull-down time which is undesirable for commuter buses, for example, which sit all day in the sun waiting for the evening part of the commute.

Heating a bus via overhead ducts is generally unsatisfactory as the bus floor is usually too cold and the ceiling too warm, due to the natural convection of the air.

Thus, it is conventional to heat a bus using floor and sidewall ducts, drawing return air to the heating unit at the floor level. The air at floor level, however, is not the most indicative of passenger compartment air temperature, and even more detrimental, it contains the highest dirt content of any air in the bus.

The noise produced by the motors and blowers of the air conditioning and air circulation system must be controlled for passenger comfort. Introducing a circuitous path between the air conditioning system and the bus ducting reduces noise level. However, this results in higher losses due to the angles and longer ducts, requiring higher fan power per cubic foot of conditioned air delivered. It is also partially self defeating as it increases the static pressure the fans have to work against, which increases both the losses and noise level.

Thus, it would be desirable, and it is the object of the present invention, to provide a new and improved air conditioning system for buses which achieves the desired passenger comfort during both heating and cooling cycles, without the disadvantages pointed out above.

SUMMARY OF THE INVENTION

Briefly, the present invention is a new and improved bus air conditioner suitable for mounting within the normal outer structure of a bus. The air conditioner provides both heating and cooling from the same integral package, which package includes all heating and cooling components except for the compressor. The compressor is driven by the bus engine, and it is thus mounted in the engine compartment of the bus.

The air conditioner provides both heating and cooling to upper and lower air distribution systems on the bus, and it thus provides cool air from the ceiling, as well as from the floor and side walls, when cooling is required, facilitating a fast pull-down. The air conditioner further provides heating from the floor and side walls, in addition to heat from the overhead ducting, assuring warm floors during the heating season.

The air conditioner utilizes a single air return common to both the upper and lower air distribution systems, and this air return, which is at the back of the bus, is horizontally oriented for noise reduction. Further, the air return is approximately at passenger head level, returning air past the temperature sensor of the unit which is most indicative of passenger compartment temperature, and also returning air with little or no dirt.

The air return is part of an acoustical plenum which surrounds the air discharge ducts where the air conditioner discharges conditioned air into the bus air duct distribution system. The acoustical plenum enables this discharge to be direct, eliminating the need for a circuitous path, thus reducing the static pressure against which the evaporator blowers must work, and reducing losses due to the direct discharge and lower static pressure. The direct discharge and elevated entry of cooled air promotes a very quick pull-down, which is essential for passenger comfort on the hereinbefore mentioned commuter buses.

The single package is made possible by a frame arrangement in which upper and lower evaporator and condenser sections, respectively, are formed by an intermediate frame structure which promotes moisture removal from the air before the air reaches first and second sets of evaporator blowers which introduce conditioned air into the bus air distribution system. The first set of evaporator blowers is directly associated with the evaporator section. The evaporator section includes the refrigerant evaporator coil and also a heating coil which controllably receives hot bus engine coolant. The first set of evaporator blowers discharges conditioned air directly into the upper bus air distribution system, passing through the acoustical plenum, as hereinbefore explained.

The frame further defines a downwardly extending central air duct which extends from the evaporator section, through the condenser section, to the second set of evaporator blowers disposed below the condenser section. The second set of evaporator blowers draws conditioned air from the evaporator section and discharges it into the lower bus air distribution system, which may include both floor and sidewall outlets.

The condenser section includes a condenser fan on both sides of the vertical duct defined by the frame, with fan drive motors being mounted on motor mounts which angle upwardly from the bottoms of side openings in the frame to the vertical duct. The skewed arrangement of the motor mounts increases the size of the motor access space. A condenser is mounted across the side of the condenser section which faces the rear of the bus. The condenser fans draw ambient air into the condenser section from appropriately located side openings in the bus and the fans discharge it through the condenser coil and away from the bus via an opening in the back or rear of the bus.

In addition to the fresh ambient air being drawn into the bus for the purpose of picking up heat rejected by the condenser, the rear bus structure within which the bus air conditioner is mounted functions as a fresh air plenum. The ambient air drawn into fresh air plenum by the condenser fans is adjacent to a rear wall of the acoustical plenum, with louvers in this rear plenum wall enabling fresh outside air to mix with return air from the bus, to ensure the desired freshness of the conditioned air.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
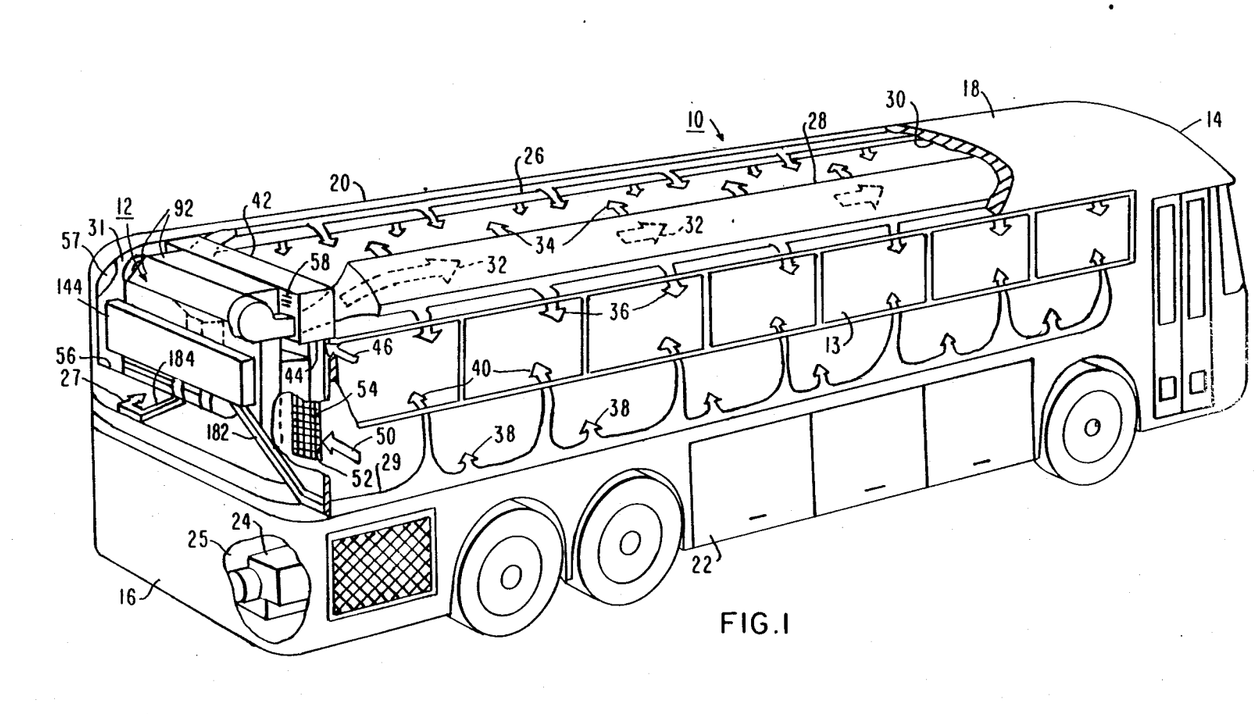
FIG. 1 is a perspective view of a bus illustrating the position of an air conditioning unit constructed according to the teachings of the invention and upper and lower air distribution systems in the bus which are connected to the air conditioning unit.

Referring now to the drawings, and to FIG. 1 in particular, there is shown a bus 10 having an air conditioner unit 12 constructed according to the teachings of the invention for providing conditioned warm or cool air, as required, for a passenger compartment 13. Bus 12 has a front 14, a back or rear 16, a roof or top 18, and first and second sides 20 and 22. Bus 10 has a straight top 18, devoid of air drag producing projections, such as would be caused by a roof mounted air conditioner unit.

Air conditioner unit 1 2, which supplies both heating and cooling for bus 10, is a single integral package except for a refrigerant compressor 24 located in an engine compartment 25 at the lower rear 16 of bus 10, with the compressor 24 being driven by a prime mover such as a bus engine. Air conditioner unit 12 is mounted in a fresh air compartment or plenum 31 at the rear 16 of bus 10, above the engine compartment 25, completely within the normal profile of bus 10, with no projections on bus 10 being required to accommodate unit 12.

Notwithstanding that air conditioner 12 is a single package, it supplies conditioned air to the bus 10 via an upper air duct distribution system which includes upper air ducts 26 and 28, and lower air duct distribution system which includes lower air ducts 27 and 29. Upper ducts 26 and 28, which are generally located above a ceiling 30 of bus 10, run the length of bus 10 along the upper right and left hand corners of the bus ceiling 30. As illustrated relative to upper air duct 28, conditioned air, indicated by arrows 32, is forced along the length of duct 28, with appropriate outlets spaced along duct 28 directing conditioned air, indicated by arrows 34 and 36, downwardly into the passenger compartment 13. The lower ducts 27 and 29, which are generally located at or below the floor level of bus 10, run the length of the bus 10 along the lower right and left hand corners of the bus floor. In addition to providing conditioned air at floor level via appropriate openings in ducts 27 and 29, indicated by arrows 38, the lower ducts 27 and 29 may communicate with vertical side wall ducts which discharge conditioned air via side outlets located intermediate the floor and ceiling, as indicated by arrows 40.

A plenum 42 lined with sound absorbing material 49, which plenum will be hereinafter referred to as acoustical plenum 42, is disposed between air conditioner unit 12 and passenger compartment 13, with the upper air ducts 26 and 28 communicating with unit 12 via acoustical plenum 42. Acoustical plenum 42 has a generally horizontally oriented bottom portion 44 which defines a return air opening 45 (FIG. 8) through which air is drawn from the passenger compartment 13 by unit 12, as indicated by arrow 46. The level of opening 45 is generally at passenger head level of a standing passenger, or above. A filter 48 (FIGS. 5 and 8) disposed within the return air opening 45 may be removed, and the acoustical plenum 42 then provides a relatively large access space for service and maintenance of certain of the components of unit 12 from within the passenger compartment 13 of bus 10. The acoustical plenum 42, which, as hereinbefore stated, is lined with a suitable sound absorbing insulation 49 (FIG. 5), enables unit 12 to discharge conditioned air directly into overhead ducts 26 and 28 for efficient transfer of conditioned air to passenger compartment 13, enabling fast pull-down without excessive noise being produced in the passenger compartment 13. Acoustical plenum 42 includes a back wall 51 which is immediately adjacent to the fresh air plenum 31 defined by bus 10.

Unit 12 draws fresh ambient air, indicated by arrow 50, into the fresh air plenum 31 and into unit 12 via openings in both sides 20 and 22 of bus 10, such as opening 52 in side 22 which is covered by an access panel or door 54 containing a grille for air entry. Unit 12 discharges heat rejected by unit 12 out the back or rear 16 of bus 10, via an opening 56 covered by a removable or hinged access panel 57 containing an appropriate grille for air passage. Fresh air 50 drawn into fresh air plenum 31 is also available adjacent to louvers 58 disposed in the back wall 51 of acoustical plenum 42. Louvers 58 may be adjusted or controlled, as desired, to provide the desired mix of bus return air 46 with fresh air 50.

The side openings in bus 10, such as side opening 52, the rear opening 56 in bus 10, and opening 45 in acoustical plenum 42, provide ample access points for servicing all components of unit 12.

Figure 2:
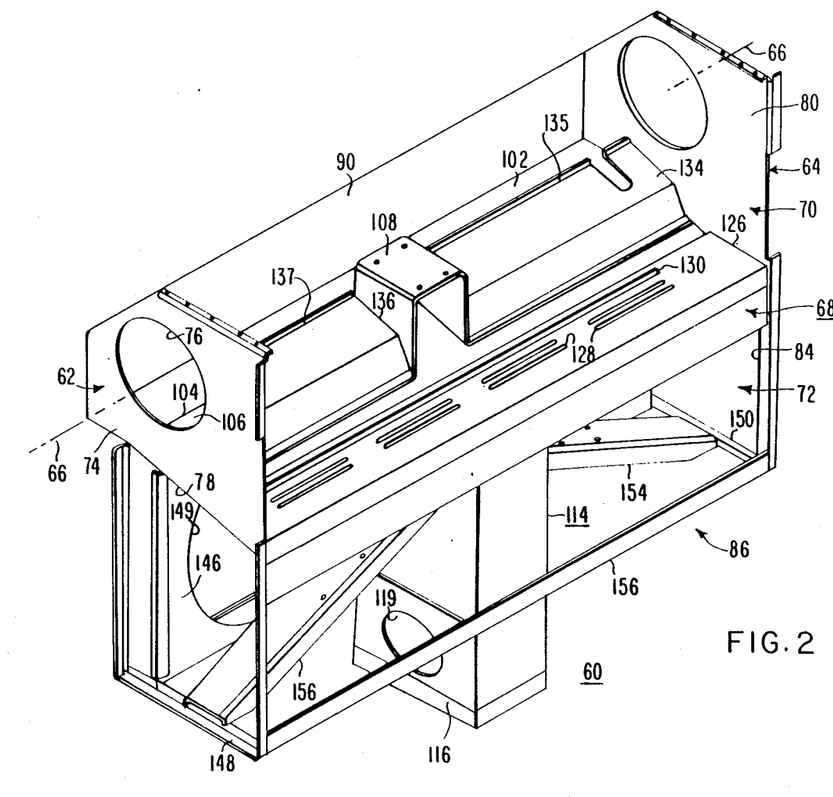
FIG. 2 is a perspective view of a frame which supports the various elements of the air conditioner, viewed from the evaporator side of the frame.
Figure 3:
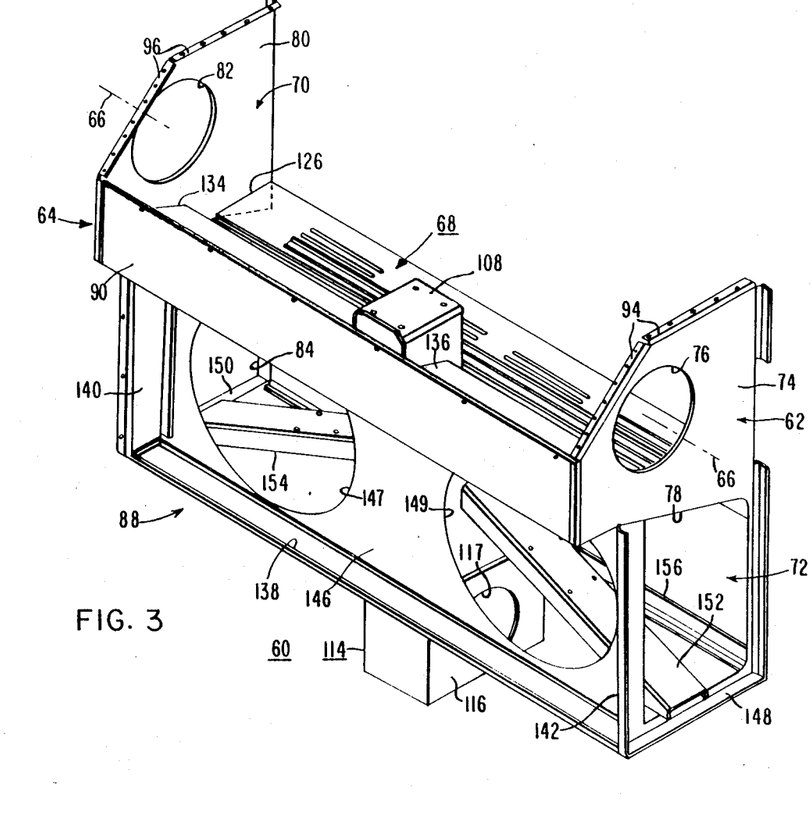
FIG. 3 is a perspective view of the frame shown in FIG. 2, except viewed from the condenser side of the frame.

Air conditioner unit 12 includes an elongated metallic frame 60, formed of a metal such as aluminum, with frame 60 being best shown in FIGS. 2 and 3. FIGS. 2 and 3 are perspective views of frame 60 illustrating evaporator and condenser sides thereof, as will be hereinafter explained. Frame 60 includes first and second axial end 62 and 64, respectively, relative to a longitudinal axis 66 which extends between the ends. A generally horizontally oriented intermediate section 68 extends between ends 62 and 64, dividing frame 60 into an upper evaporator section 70 and a lower condenser section 72.

The first axial end 62 of frame 60 is defined by an upstanding wall 74. Wall 74 includes a circular opening 76 into evaporator section 70 and a generally rectangular opening 78 into condenser section 72. In like manner the second axial end 64 of frame 60 is defined by an upstanding wall 80. Wall 80 includes a circular opening 82 into evaporator section 70 and a generally rectangular opening 84 into condenser section 72.

Frame 60 includes a front 86, with reference to the front 14 of bus 10, with front 86 being the hereinbefore mentioned "evaporator side" of frame 60, which is shown most clearly in FIG. 2. Frame 60 includes a back 88, with reference to the back or rear 16 of bus 10, with back 88 being the hereinbefore mentioned "condenser side" of frame 60, which is shown most clearly in FIG. 3.

Figure 5:
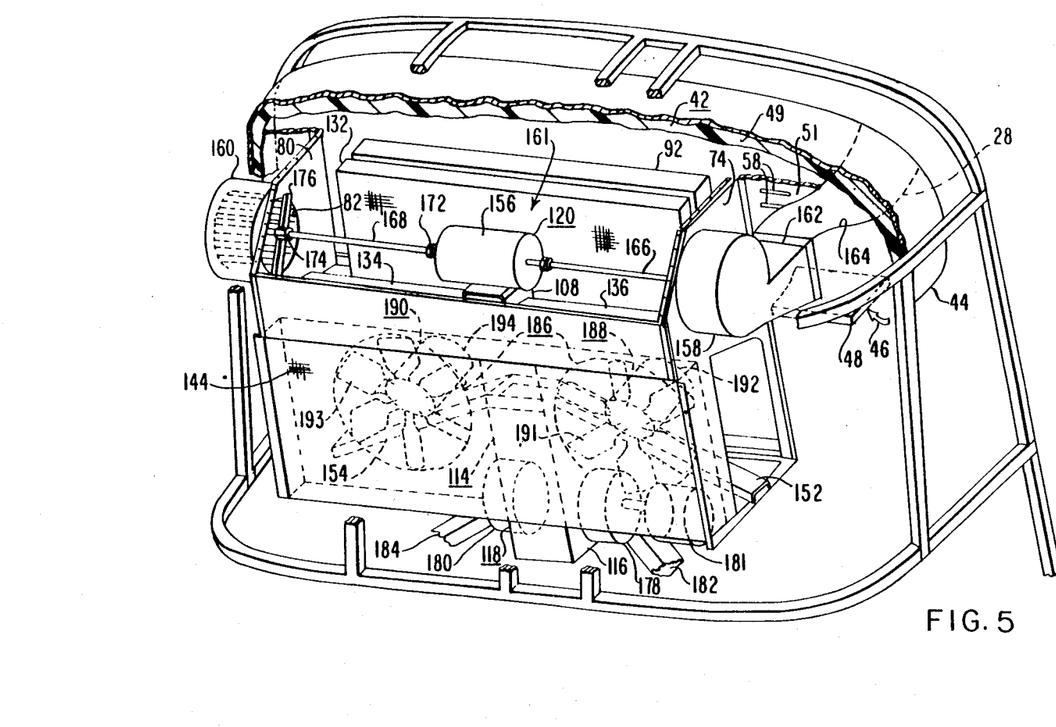
FIG. 5 is a perspective view of the rear of the bus shown in FIG. 1, with parts of the bus cut away, to more clearly illustrate the various components of the air conditioner unit.
Figure 7:
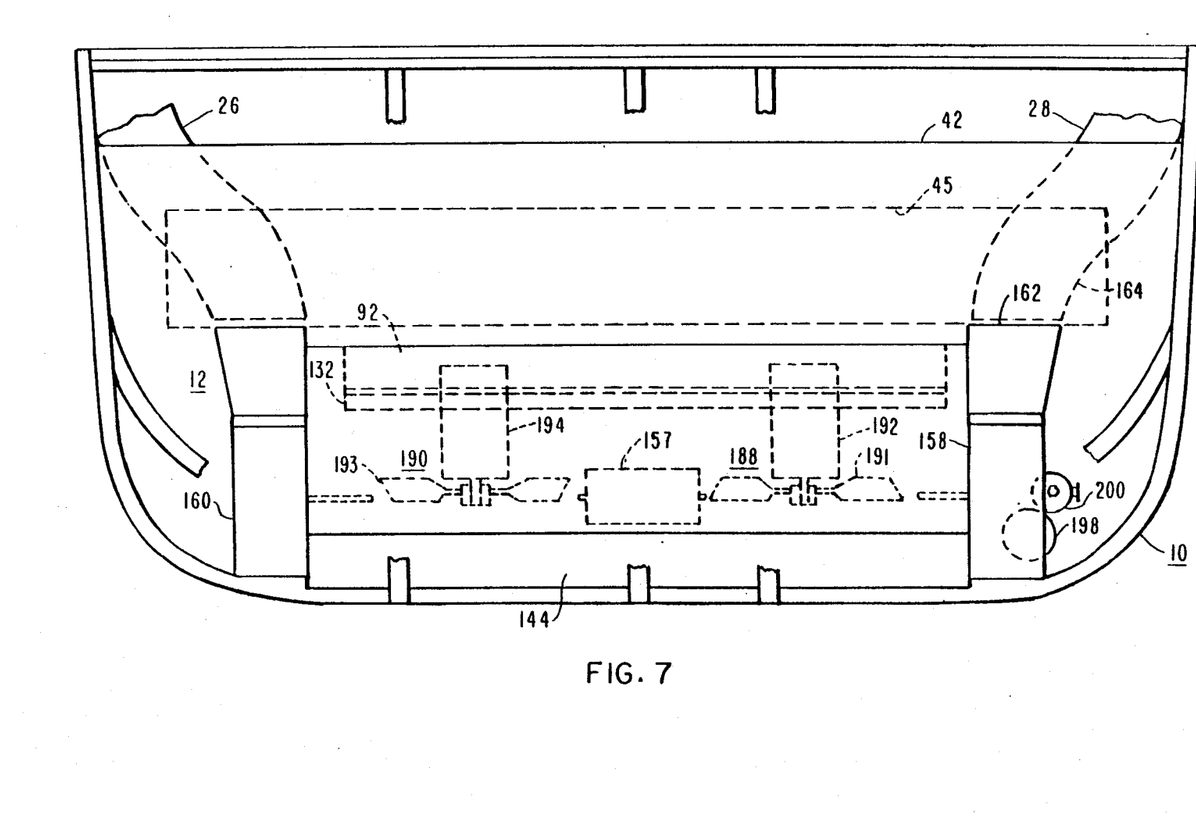
FIG. 7 is a plan view of the air conditioner unit shown in FIGS. 1, 5 and 6, with parts cut away.
Figure 8:
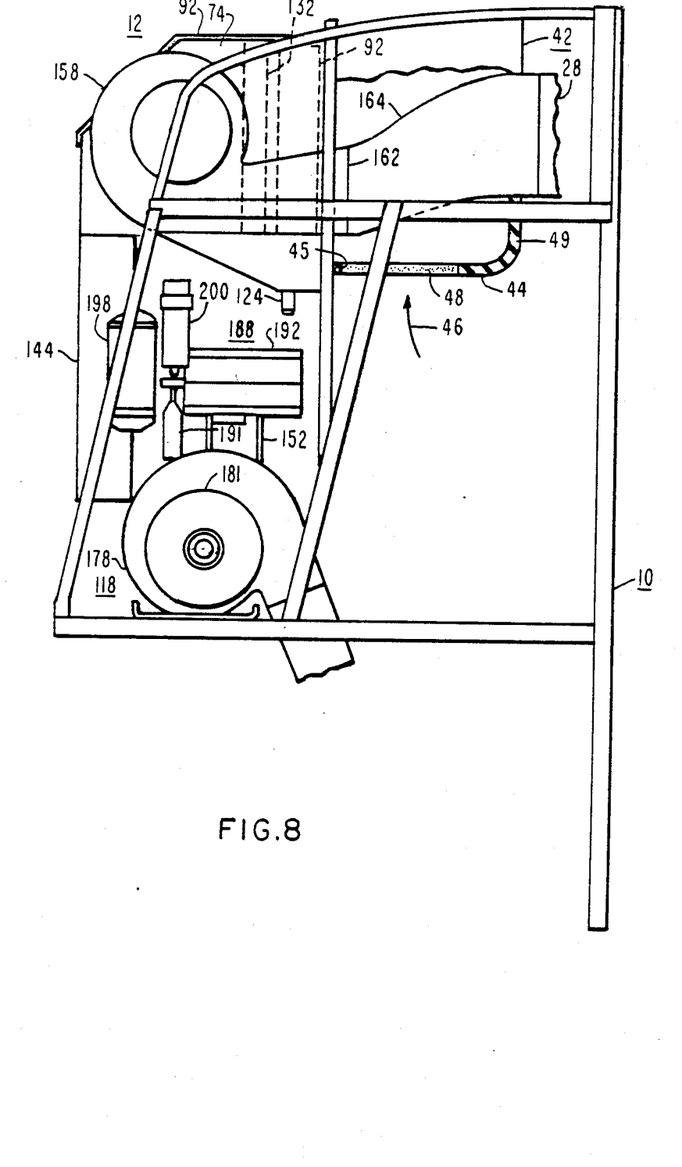
FIG. 8 is a side elevational view of the air conditioner unit shown in FIGS. 1, 5, 6 and 7.

The evaporator section 70 is defined by intermediate section 68, upstanding walls 74 and 80, an upstanding wall 90 which joins the intermediate section 68 and walls 74 and 80 along the back 88 of frame 60, and a removable cover 92 which is shown in FIG. 1. Cover 92 is not shown in FIGS. 2 and 3 in order to more clearly illustrate the details of frame 60. Cover 92 is attached to flanges 94 and 96 on upstanding walls 74 and 80, respectively. Side 86 of evaporator section 70 of frame 60 is open, being closed by the assembly of an evaporator coil 98 with frame 60, as shown in FIGS. 5, 7 and 8.

Figure 4:
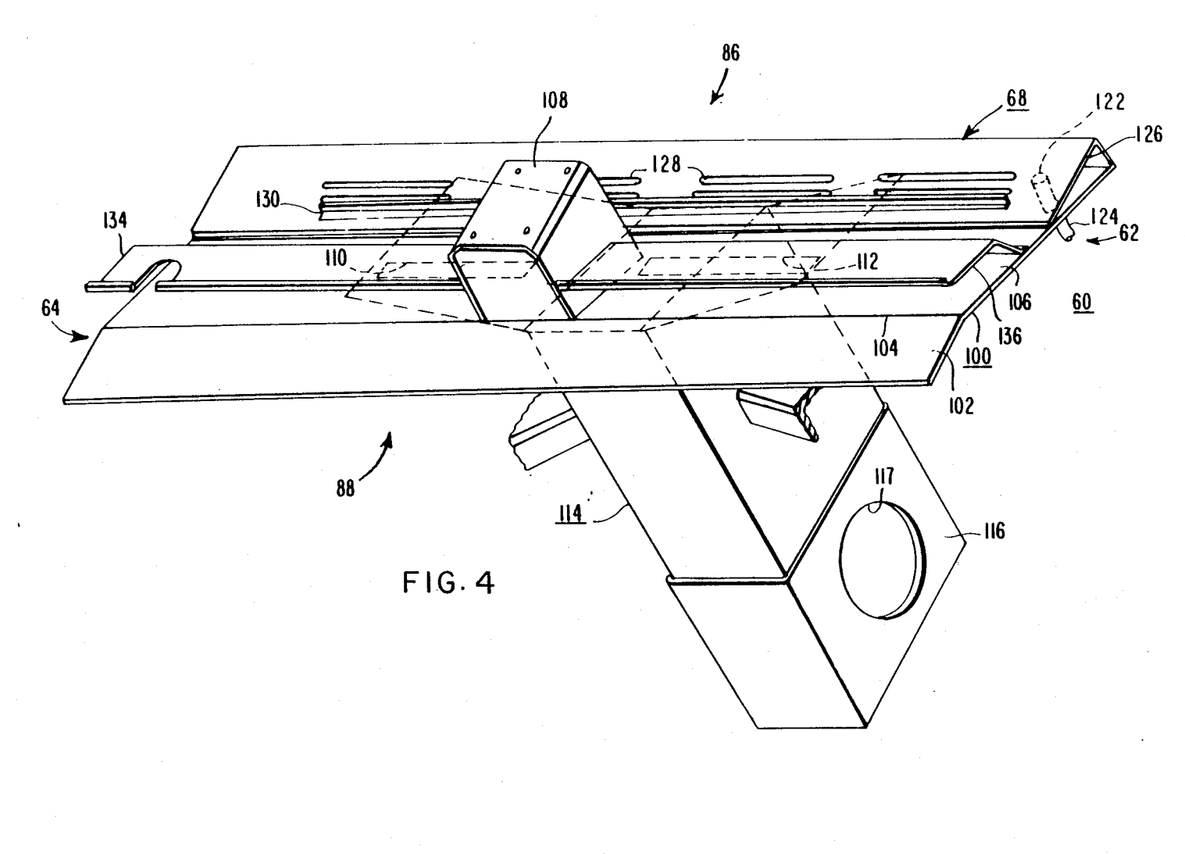
FIG. 4 is a view of the frame shown in FIGS. 2 and 3, except with parts removed to more clearly illustrate an intermediate portion of the frame which separates an upper evaporator section from a lower condenser section, and a vertically extending duct which communicates conditioned air from the evaporator section to a lower evaporator blower assembly.

The intermediate section 68 of frame 60, which is best shown in a fragmentary view of frame 60 in FIG. 4, includes a base member 100 formed of sheet metal, such as aluminum. Base member 100, which may also form the hereinbefore mentioned upstanding wall portion 90 of evaporator section 70, if desired, includes a horizontally oriented section 102 which extends between the first and second ends 62 and 64, starting on side 88 of frame. Base member 100 then angles or slopes downwardly from the horizontal portion 102, starting at bend 104, to form a sloping portion 106 of base member 100 which proceeds to front 86 of frame 60. Sloping portion 106, which functions as a drain pan for unit 12, includes an upstanding motor mount 108 disposed intermediate ends 62 and 64. Sloping portion 106 also includes one or more openings, such as openings 110 and 112 disposed on opposite sides of motor mount 108 for communicating conditioned air in the evaporator section 70 with a centrally disposed, vertically oriented air duct 114 which extends downwardly from the intermediate section 68, through the condenser section 72. Duct 114 is funnel shaped at the upper end in order to encompass the openings 110 and 112, which extend outside the vertical projection of duct 114 in order to provide the required opening area. In practice, as will be hereinafter explained, a lower section 116 of duct 114 is preferably a part of a lower evaporator air delivery assembly 118 shown in FIGS. 5, 6 and 8, with an upper evaporator air delivery assembly 120, shown most clearly in FIG. 5, being associated with the evaporator section 70. The lower portion 116 of duct 114 includes openings 117 and 119 on opposite sides thereof for communicating with the lower evaporator air delivery assembly 118. Frame 60, with its assembled components, may simply be lowered vertically into operating position such that duct 114 enters the lower portion 116 with a sliding gasketed fit. The lower portion 116 should be installed in bus 10, along with the associated lower air delivery assembly 118, prior to the installation of the main portion of the unit 12 in bus 10.

Sloping portion 106 of base member 100 includes one or more openings at the lowest portion of the slope for draining evaporator condensate, such as opening 122 shown connected to a drain hose 124.

Intermediate section 68 further includes a horizontally oriented evaporator and heater coil support plate 126 which is fixed to the sloping portion 106 of base member 100. Support plate 126 includes a plurality of openings 128 for enabling condensate on evaporator coil 98 to drop to the sloping drain pan portion 106 of base member 100. An elongated right angle member 130 is fixed to support plate 126, to physically separate the evaporator coil 98 from a heater coil 132 (FIG. 5), and also to block moisture which is deposited on support plate 126 by the evaporator coil 98 from being forced towards back 88 of frame 60.

Moisture baffles 134 and 136 are fixed to the sloping portion 106 of base member 100, on opposite sides of motor mount 10. Air is drawn through the evaporator section 70 from front 86 towards back 88 of frame 60, and the moisture baffles 134 and 136 have an end fixed to sloping portion 106 closely adjacent to the horizontal support plate 126. Baffles 134 and 136 then extend up the slope, towards the back 88 of frame 60, angling upward and diverging from the sloping portion 106, to extend in spaced relation over the openings 110 and 112 which lead to the vertical air duct 114. Thus, any moisture which condenses in evaporator coil 98 and collects on support plate 126 must go up the steeply inclined surface of the baffles 134 and 136, and then over upturned ends 135 and 137 of baffles 134 and 136, respectively, before any moisture can enter openings 110 and 112. Thus, baffles 134 and 136 trap and return to the sloping drain pan 106 a large percentage of any evaporator condensate, preventing it from entering openings 110 and 112.

The condenser side or back 88 of frame 60, adjacent to the lower condenser section 72, includes a lower support channel 138, and side support channels 140 and 142 for receiving a condenser coil 144 (FIG. 5). An upstanding wall 146 extends between frame ends 62 and 64, with wall 146 being immediately adjacent to the condenser support channels 138, 140 and 144. Wall 146 defines two large openings 148 and 150 disposed on opposite sides of vertical duct 114. Fresh ambient air is forced through openings 148 and 150 by condenser air delivery means, as will be hereinafter described.

Side openings 78 and 84 to condenser section 72 are partially defined by bottom or lower frame portions 148 and 150, respectively. Motor mounts 152 and 154 start at the bottom frame portions 148 and 150, respectively, and they angle upwardly until reaching the vertical air duct 114, where they are suitably fixed. This arrangement for motor mounts 152 and 154 provides increased access space for motors which are mounted on the mounts 152 and 154, via the side openings 78 and 84 to the condenser section 72. A lower angle member 156 extends across the bottom of frame 60 to complete the condenser section 72.

Figure 6:
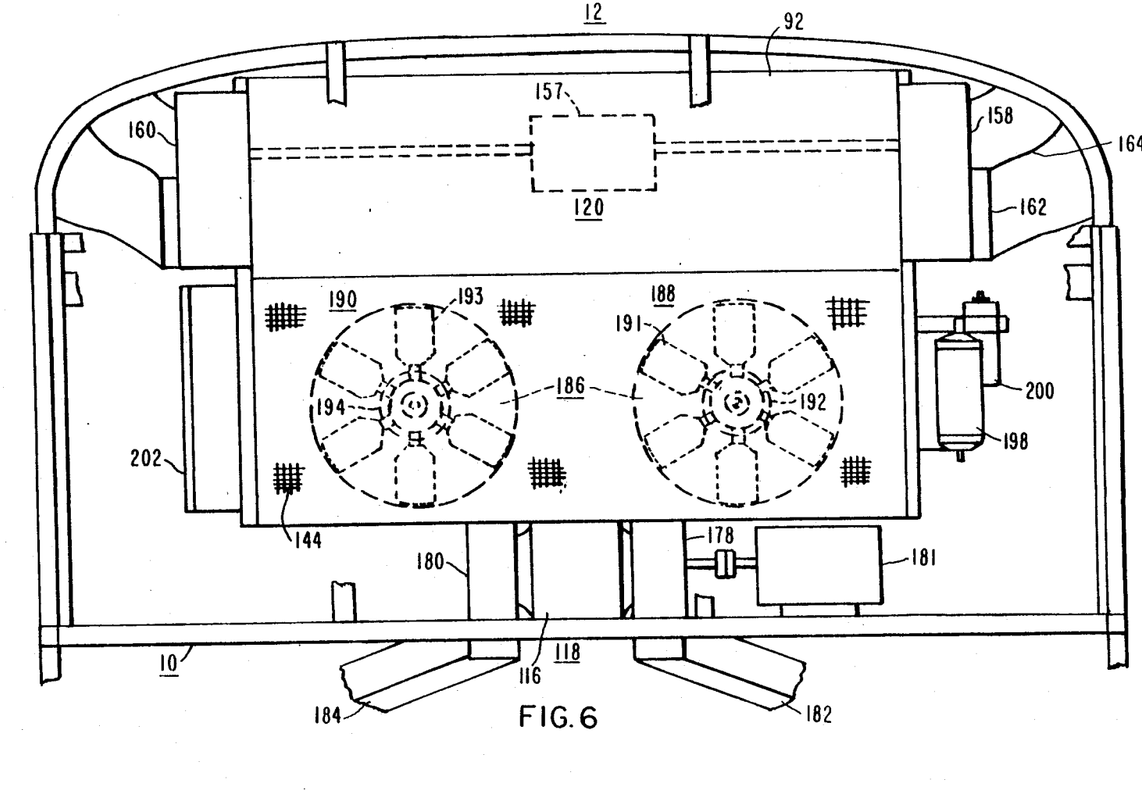
FIG. 6 is an elevational rear view of the air conditioner unit shown in FIGS. 1 and 5, with parts cut away to more clearly illustrate the components thereof.

FIGS. 5 through 8 illustrate air conditioner unit 12 installed in bus 10, with FIG. 5 being a perspective view of the back of bus 10 with parts of bus 10 cut away to more clearly illustrate the various components of unit 12. The remaining FIGS. 6, 7 and 8 are rear elevational, plan, and side elevational views of unit 12. Evaporator coil 98 is positioned on the support plate 126, closely adjacent to the outer vertical plane which defines the evaporator side or front 86 of unit 12. The heater coil 132, which may receive hot radiator coolant from the bus engine, for example, is disposed closely adjacent to evaporator coil 98, separated therefrom by angle 130. The first evaporator air delivery means or assembly 120 includes a double ended motor 157 which is mounted on motor mount 108. Centrifugal blowers 158 and 160 are fixed to the external sides of upstanding walls 74 and 80, respectively, with inlet sides of blowers 158 and 160 being aligned with openings 76 and 82, respectively, which communicate with an evaporator plenum 161 defined by evaporator section 70. Discharge sides of blowers 158 and 160, such as discharge side 162 of blower 158, direct conditioned air directly into bus air duct 28 via a duct section 164 which extends through acoustical plenum 42. Motor 157 is linked to rotary blades of blowers 158 and 160 via shafts 166 and 168, respectively, which are coupled to motor 156 via couplings 170 and 172. Shafts 166 and 168 are supported adjacent to blowers 158 and 160 via suitable bearings, such as bearing 174 adjacent to blower 160. A bearing support 176 extends across opening 82 and is fixed to wall 80.

The second or lower evaporator air delivery means 118 includes blowers 178 and 180 fixed to section 116 of duct 114, with blowers 178 and 180 being driven by an electric motor 181. Air inlets to blowers 178 and 180 are aligned with openings 117 and 119, respectively. Air discharge outlets of blowers 178 and 180 are connected to air ducts 182 and 184 which angle downwardly to connect to the bottom air distribution ducts 29 and 27 in bus 10.

Condenser air delivery means 186 is preferably in the form of first and second axial flow fans 188 and 190 which include fan blades 191 and 193 driven by motors 192 and 194 which are respectively mounted on upwardly angled motor mounts 152 and 154.

In the operation of air conditioner unit 12, bus return air 46, and also outside or ambient air 50 when louvers 58 are open, are drawn into acoustical plenum 42 via the horizontally oriented filter 48 supported by the bottom 44 of plenum 42. This air is drawn into the evaporator plenum 161, passing through the evaporator and heater coils 98 and 132, respectively. Blowers 158 and 160 discharge a portion of the conditioned air directly into the upper bus air ducts 28 and 26. Blowers 178 and 180 also draw a portion of the conditioned air down the vertical air duct 114, and blowers 178 and 180 discharge the conditioned air into ducts 182 and 184 which lead to the lower bus air ducts 29 and 27, respectively.

Condenser fans 188 and 190 draw air into the fresh air plenum 31 defined by bus 10 via the side openings, such as side opening 52, and into the condenser section 72. Fans 188 and 190 then force the fresh ambient air through condenser coil 144, where air containing heat rejected from condenser coil 144 is then discharged from the back plane 16 of the bus via rear opening 56.

Refrigerant components, such as a receiver 198 and drier 200, are accessible via the side opening 52 on the curb side of bus 10, and electrical controls, mounted in electrical control cabinet 202, are accessible via a similar side opening on the street side of bus 10. Condenser fans 188 and 190 are also accessible via the side openings in bus 10, such as side opening 52 adjacent to condenser fan 188, with the inclined motor mounts 152 and 154 improving access space. The rear access panel 57 which covers rear opening 56 may be removed for access to the lower evaporator air delivery means 118, condenser coil 144, cover 92 on the evaporator section 70, and the components mounted within the evaporator section 70, including the upper evaporator air delivery means 120. Finally, return air filter 48 may be removed and access may be gained to evaporator coil 98 and other refrigerant components, such as a temperature sensor for a temperature thermostat mounted with the electrical control cabinet 202.

In summary, bus air conditioner unit 12 is mounted in a rear fresh air plenum of bus 10, within the normal outside structure of bus 10, with unit 12 providing heating and cooling from a single air conditioner package. The single unit 12 directly discharges conditioned air into the bus roof ducts 26 and 28 for quick pull down with little efficiency loss, via an acoustical plenum 42 which acoustically isolates the unit 12 from passengers in the passenger compartment 13. Bus return air 46 is directed to unit 12 via the same acoustical plenum 42, with the opening 45 to the air return acoustical plenum 42 being elevated such that a temperature sensor disposed to sense return air temperature senses the correct temperature of the passenger compartment for passenger comfort, and also to prevent dirt from being drawn into unit 12. This single air return serves the roof ducts 26 and 28 via an upper evaporator air delivery assembly 120, and also floor ducts 27 and 29 via a lower evaporator air delivery assembly 118 which draws conditioned air from evaporator plenum 161 via a vertical air duct 114 which splits the condenser section 72. The frame 60 of unit 12 provides several unique features, including the inclined motor mounts 152 and 154, and the intermediate section 68 which directs evaporator condensate to a drain pan or base 100, while preventing air movement from dragging moisture into the vertical air duct 114. The acoustical plenum 42 also includes vents 58 disposed in fluid flow communication the fresh air chamber 31 which surrounds the unit 12, permitting a desired mixing of fresh air 50 with the bus return air 46. The single integral unit 12 will provide quick cooling, when cooling is required, and it will warm the floor of the passenger compartment 13 when heating is required. When neither heating nor cooling is required, unit 12 may be used to circulate fresh outside air 50 in all four air delivery ducts 26, 28, 27 and 29.

I claim:

1. A bus air conditioner suitable for mounting within the profile of a bus, comprising:

a bus having a front, back and first and second sides, openings in said back and said first and second sides, and upper and lower air duct distribution systems for receiving conditioned air, an elongated frame mounted in said bus, immediately adjacent to the back, said frame defining an evaporator section in an upper portion of the frame, a condenser section in a lower portion of the frame, below said evaporator section, and an air duct which extends downwardly from the evaporator section, through said condenser section, an evaporator coil in said evaporator section, first evaporator air delivery means associated with the evaporator section, second evaporator air delivery means associated with the air duct, below the condenser section, a condenser coil in said condenser section, and condenser air delivery means associated with said condenser section, said condenser air delivery means drawing air into the condenser section via the openings in the first and second sides of the bus, and discharging air from the condenser section via the opening in the back of the bus, said first evaporator air delivery means drawing return air from the bus, at a level above the condenser section, said first evaporator air delivery means discharging conditioned air into the upper air duct distribution system, said second evaporator air delivery means receiving conditioned air from said evaporator section via said air duct, said second evaporator air delivery means discharging conditioned air into the lower air duct distribution system.

2. The bus air conditioner of claim 1 including an acoustical plenum disposed in the bus adjacent to the evaporator section of the frame, with the first and second evaporator air delivery means drawing return air from the bus into the evaporator section via said acoustical plenum.

3. The bus air conditioner of claim 2 wherein the acoustical plenum includes a generally horizontally oriented bottom portion which defines an opening through which air from the bus is drawn by the first and second evaporator air delivery means.

4. The bus air conditioner of claim 2 wherein the upper air duct distribution system includes air ducts which proceed to the evaporator section of the frame via the acoustical plenum, with the first evaporator air delivery means discharging conditioned air directly into said air ducts.

5. The bus air conditioner of claim 1 including a heating coil disposed in the evaporator section of the frame, enabling the bus air conditioner to provide both heating and cooling for the bus, as required.

6. The bus air conditioner of claim 1 wherein the frame includes an intermediate section which divides the frame into the upper and lower portions, with said intermediate portion including a sloping member, a horizontally oriented evaporator coil support plate disposed above and fixed to said sloping member, openings in the support plate which enable condensation from the evaporator coil to the sloping member, and a drain outlet at a low point of the sloping member.

7. The bus air conditioner of claim 6 including an air duct opening in the sloping member disposed in communication with the air duct defined by the frame, and a moisture baffle fixed to the sloping member which extends in spaced relation above the air duct opening, said moisture baffle forcing conditioned air being drawn into the air duct by the second evaporator air delivery means to initially follow an upward moisture blocking path.

8. The bus air conditioner of claim 1 wherein the frame includes first and second ends, and the first evaporator air delivery means includes first and second blowers respectively fixed to the first and second ends of the frame, and an electric motor disposed in the evaporator section which drives said first and second blowers.

9. The bus air conditioner of claim 1 wherein the air duct defined by the frame includes a portion which extends below the condenser section and into communication with the second evaporator air delivery means, said second evaporator air delivery means including first and second blowers and an electric drive motor.

10. The bus air conditioner of claim 1 wherein the frame includes first and second end portions which define first and second openings, respectively, disposed adjacent to the condenser section, said frame including bottom frame portions which define lower sides of the openings, said frame including first and second electric motor mounts which angle upwardly from said bottom frame portions to the air duct defined by the frame, and wherein the condenser air delivery means includes first and second fans driven by first and second electric motors mounted on said first and second angled motor mounts.

11. The bus air conditioner of claim 2 wherein the bus defines a fresh air plenum adjacent to the acoustical plenum, into which air is drawn by the condenser air delivery means, and including openings in the acoustical plenum which communicate with said fresh air plenum, enabling air in the fresh air plenum to enter the acoustical plenum and mix with return air from the bus.

* * * * *